US010919593B2

(12) United States Patent
Feuerstein

(10) Patent No.: US 10,919,593 B2
(45) Date of Patent: *Feb. 16, 2021

(54) GRIP COVER

(71) Applicant: SRAM, LLC, Chicago, IL (US)

(72) Inventor: Paul A. Feuerstein, Brookfield, IL (US)

(73) Assignee: SRAM, LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/794,179

(22) Filed: Oct. 26, 2017

(65) Prior Publication Data

US 2018/0043956 A1 Feb. 15, 2018

Related U.S. Application Data

(63) Continuation of application No. 14/802,061, filed on Jul. 17, 2015, now Pat. No. 9,821,871.

(51) Int. Cl.
*B62K 21/26* (2006.01)
*B62K 23/06* (2006.01)
*B62J 23/00* (2006.01)
*B62K 23/02* (2006.01)
*B62K 23/04* (2006.01)

(52) U.S. Cl.
CPC .............. *B62J 23/00* (2013.01); *B62K 21/26* (2013.01); *B62K 23/02* (2013.01); *B62K 23/06* (2013.01); *B62K 23/04* (2013.01)

(58) Field of Classification Search
CPC ........ B62K 21/26; B62K 23/02; B62K 23/04; B62K 23/06; B62J 23/00; B25G 1/10
See application file for complete search history.

(56) References Cited

U.S. PATENT DOCUMENTS

| | | | |
|---|---|---|---|
| 1,394,033 A | 10/1921 | Mcleod et al. | |
| 1,779,981 A | 10/1930 | Emery et al. | |
| 2,535,250 A | 12/1950 | Allen et al. | |
| 6,073,730 A | 6/2000 | Abe | |
| 6,112,618 A | 9/2000 | Yates | |
| 6,263,759 B1 | 7/2001 | Hollingsworth et al. | |
| 6,651,862 B2 | 11/2003 | Driscoll et al. | |
| 6,957,597 B2 | 10/2005 | Irie et al. | |
| 8,545,966 B2 | 10/2013 | Vito et al. | |
| 9,027,433 B2 * | 5/2015 | Dal Pra' | B62K 23/06 74/502.2 |
| 9,174,696 B2 | 11/2015 | Bourgeois et al. | |
| 10,232,905 B2 * | 3/2019 | Miki | B62M 25/04 |
| 2003/0226421 A1 | 12/2003 | Livingston | |
| 2005/0016312 A1 | 1/2005 | Dal Pra | |
| 2005/0126331 A1 | 6/2005 | Dal Pra | |

(Continued)

FOREIGN PATENT DOCUMENTS

| | | |
|---|---|---|
| EP | 1394033 | 3/2004 |
| EP | 1779981 | 5/2007 |

(Continued)

*Primary Examiner* — Adam D Rogers

(57) ABSTRACT

A grip cover for a bicycle control device includes a high durometer portion that is configured to engage the bicycle control device to maintain the grip cover in contact with the bicycle control device. The grip cover further includes a low durometer portion that is connected to the high durometer portion.

18 Claims, 15 Drawing Sheets

(56) References Cited

U.S. PATENT DOCUMENTS

| | | |
|---|---|---|
| 2008/0210045 A1 * | 9/2008 | De Perini .............. B62K 23/02 74/502.2 |
| 2011/0100154 A1 | 5/2011 | Johnson |
| 2014/0076097 A1 | 3/2014 | Stewart |
| 2015/0284049 A1 | 10/2015 | Shipman et al. |
| 2016/0264200 A1 | 9/2016 | Fujimoto et al. |
| 2016/0264213 A1 | 9/2016 | Swanson et al. |

FOREIGN PATENT DOCUMENTS

| | | |
|---|---|---|
| EP | 2100805 | 9/2009 |
| EP | 2535250 | 12/2012 |
| JP | 2016168998 | 9/2016 |
| WO | 2002026555 | 4/2002 |
| WO | 2002081294 | 10/2002 |

* cited by examiner

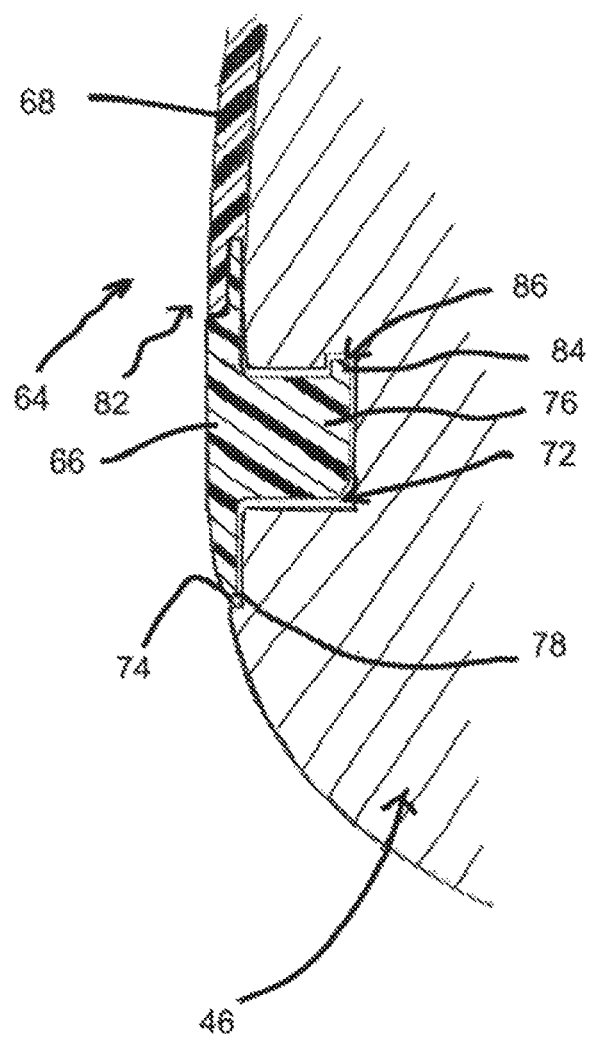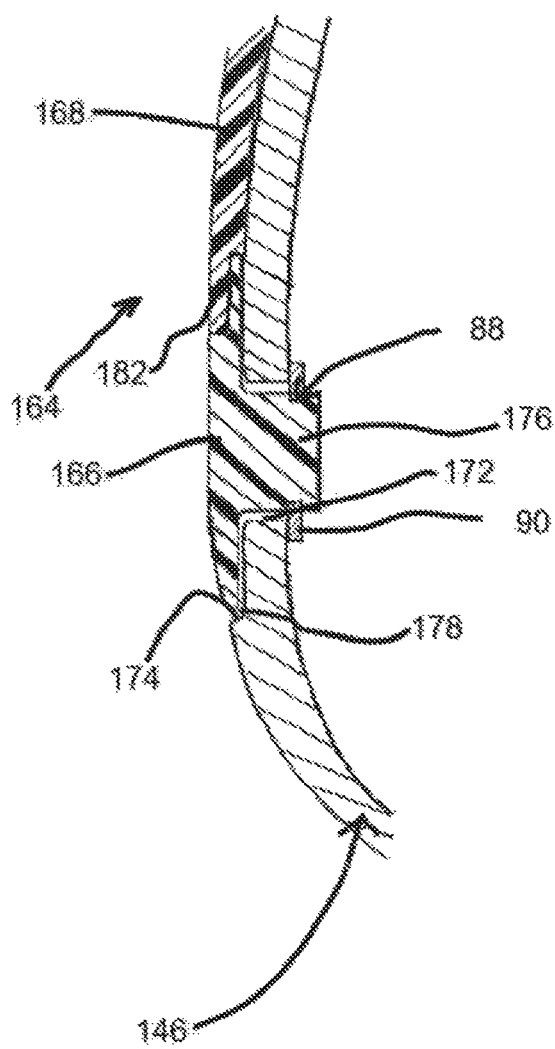

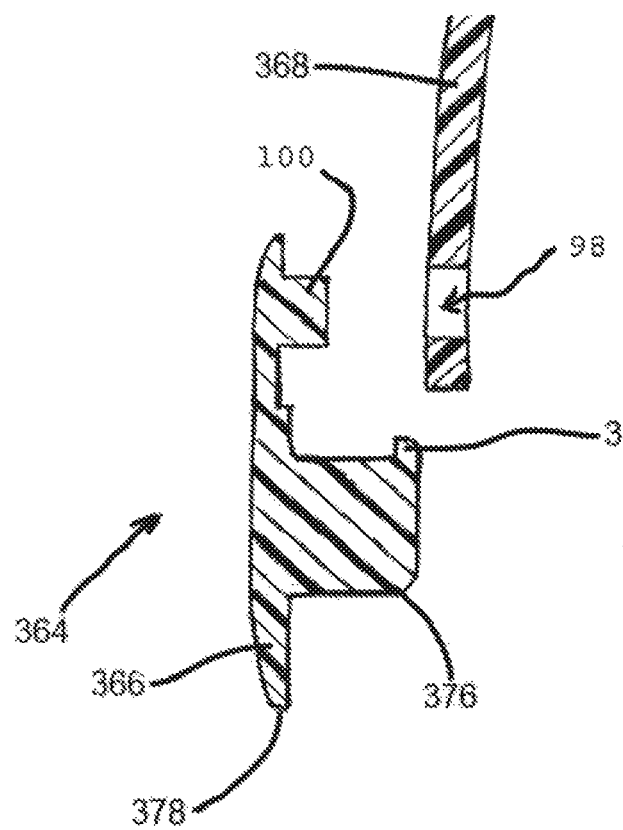
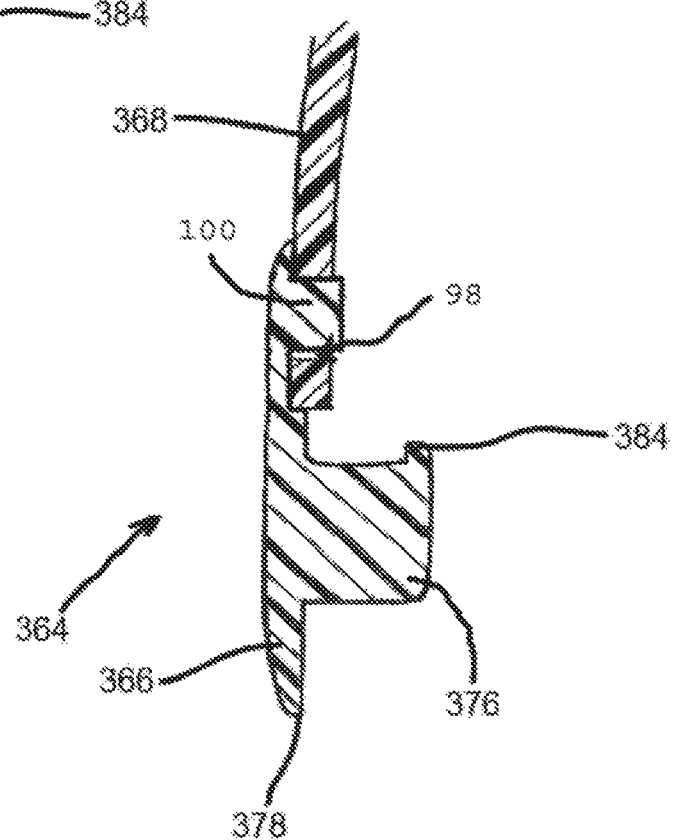

GRIP COVER

This application is a continuation of U.S. patent application Ser. No. 14/802,061, filed Jul. 17, 2015, the contents of which are herein incorporated in their entirety.

BACKGROUND OF THE INVENTION

Typical hand actuated control devices such as brake/shifters or brake levers for bicycles and other handlebar-steerable vehicles may include a grip cover that is stretched over portions of a control device to provide a cushion and/or an ergonomic gripping surface for a user. The grip cover may be made of an elastic material such as rubber. The grip cover may be removable from the control device to provide access to internal components thereof.

SUMMARY

In an embodiment, a grip cover for a bicycle control device is provided. The grip cover includes a high durometer portion comprising an attachment mechanism that includes a projection configured to engage the bicycle control device to maintain the grip cover in contact with the bicycle control device. The grip cover also includes a low durometer portion connected to the high durometer portion, the low durometer portion dimensioned to fit on the bicycle control device.

BRIEF DESCRIPTION OF DRAWINGS

FIG. 5 is partial, sectional view of the bicycle control device of FIG. 2 taken along the line 5-5 of FIG. 2;

FIG. 6 is a partial, sectional view of a bicycle control device according to another embodiment;

FIG. 8 is a partial, exploded sectional view of a grip cover according to another embodiment;

FIG. 9 is a view of the grip cover similar to that shown in FIG. 8, except that a tab is coupled to a low durometer portion;

Other aspects and advantages of the embodiments disclosed herein will become apparent upon consideration of the following detailed description, wherein similar or identical structures have similar reference numerals.

DETAILED DESCRIPTION

Figure 1:
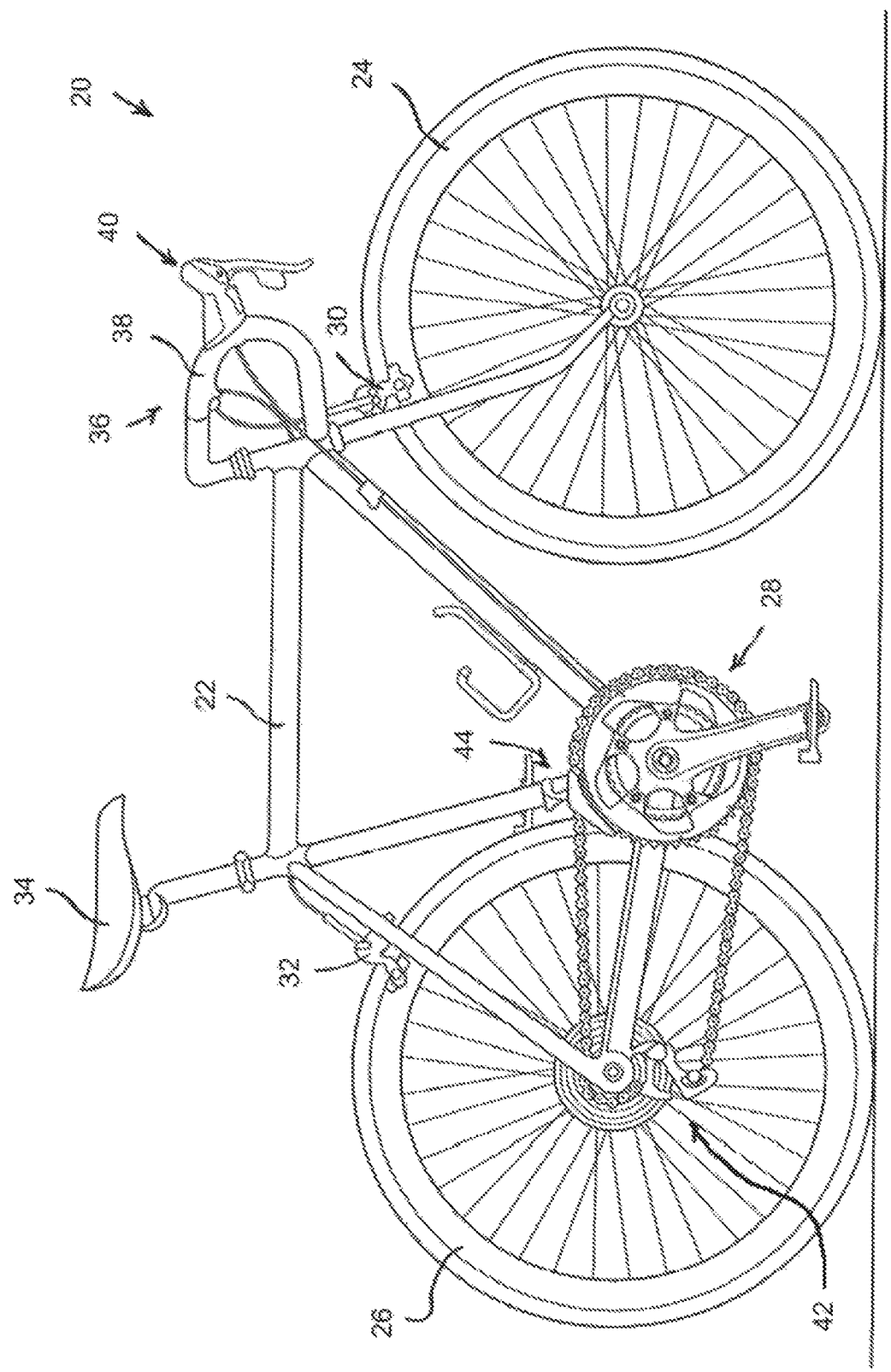
FIG. 1 is a right side elevational view of a road bicycle according to one embodiment.

With reference to the disclosure herein, a grip for a bicycle control device is described. One exemplary handlebar-steered bicycle 20 is depicted in FIG. 1. However, the present disclosure is practicable with other bicycles and other handlebar-steerable vehicles, as desired. The bicycle 20 generally includes a frame 22 supported on a front wheel 24 and a rear wheel 26. A drivetrain 28 is arranged to provide power to the rear wheel 26. A front brake 30 and a rear brake 32 are arranged to slow rotation of the front wheel 24 and the rear wheel 26, respectively. A saddle 34 is provided for use by a rider. Further, a handlebar assembly 36 is arranged to control the direction of the front wheel 24 and communicate with the drivetrain 28, the front brake 30, and the rear brake 32 to control operation thereof.

It is to be understood that the specific arrangement and illustrated components of the frame 22, front wheel 24, rear wheel 26, drivetrain 28, front brake 30, rear brake 32, and saddle 34 are nonlimiting to the disclosed embodiments. For example, while the front brake 30 and the rear brake 32 are illustrated as hydraulic rim brakes, hydraulic disc brakes are contemplated and encompassed within the scope of the disclosure. Additionally, mechanical brake systems including mechanical rim brakes and mechanical disk brakes are contemplated and encompassed within the scope of the present disclosure.

The handlebar assembly 36 includes a handlebar 38, a right bicycle control device 40, and a left bicycle control device (not shown). Typically, the right bicycle control device 40 controls operation of a rear derailleur 42 (part of the drivetrain 28) and the rear brake 32 while the left bicycle control device controls a front derailleur 44 (part of the drivetrain 28) and the front brake 30. The illustrated handlebar 38 is a drop-style handlebar. In other embodiments, different handlebar styles may be employed (e.g., bullhorn, flat, riser, etc.), as desired.

Figure 2:
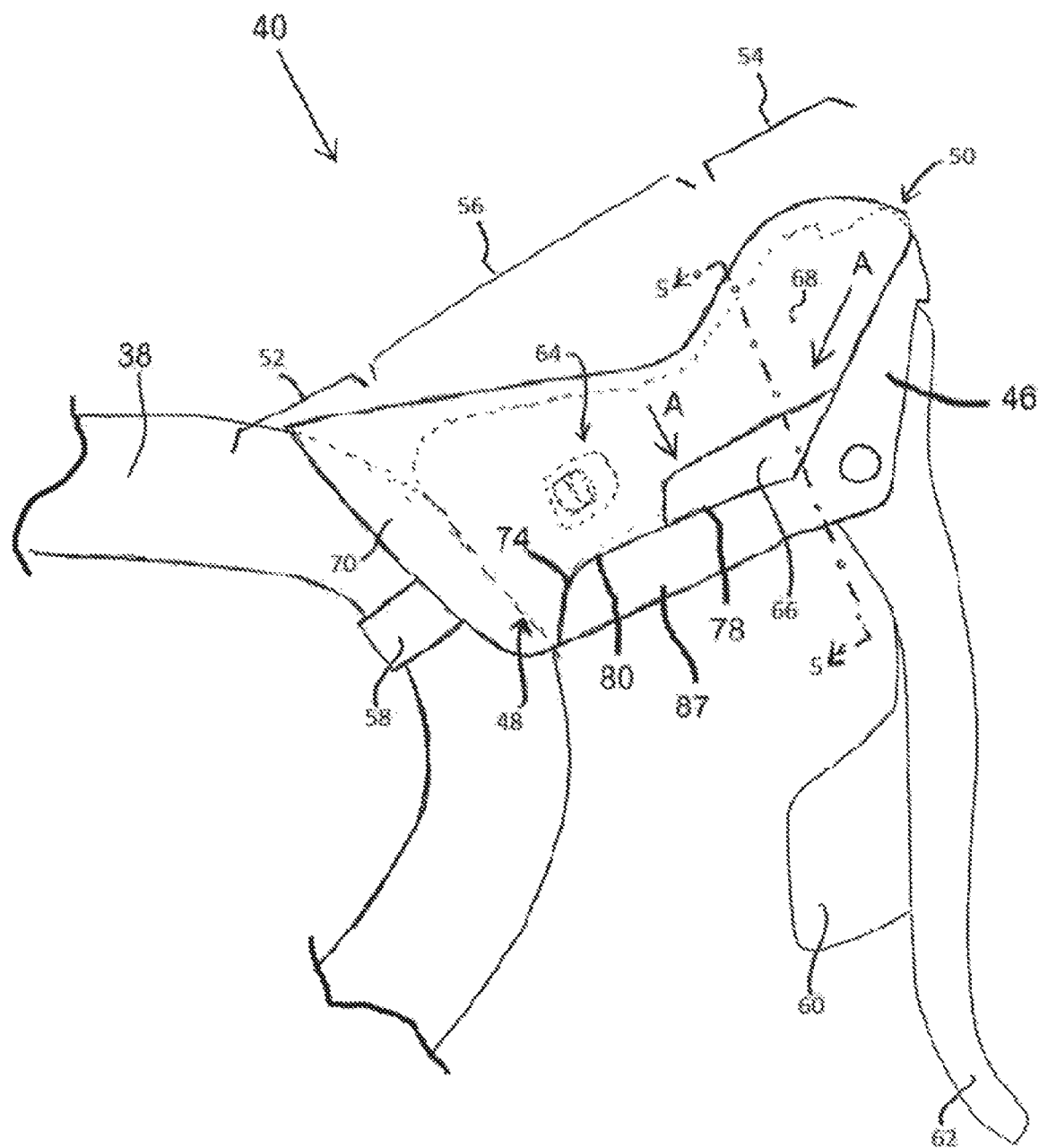
FIG. 2 is a right side elevational view of a bicycle control device of the road bicycle of FIG. 1.

FIG. 2 shows the right bicycle control device 40 attached to the handlebar 38. The right bicycle control device 40 includes a housing 46 (e.g., a shifter body) that has first and second ends 48, 50. The housing 46 includes a handlebar mounting portion 52 at the first end 48, a horn portion 54 at the second end 50, and a gripping portion 56 arranged between the handlebar mounting portion 52 and the horn portion 54. The handlebar mounting portion 52 supports a clamp or clasp 58 used to fasten the right bicycle control device 40 to the handlebar 38. In this embodiment, a shift lever 60 and a brake lever 62 are coupled to the housing 46, and interact with the rear derailleur 42 and the rear brake 32, respectively. In this embodiment, the left bicycle control device (not shown) is substantially identical and includes similar structure to attach to the handlebar 38 and shift and brake levers to interact with the front derailleur 44 and the front brake 30, respectively. In other embodiments the left and right bicycle control devices may interact with different combinations of bicycle components. For purposes of simplicity, the right bicycle control device 40 will be discussed, however, the structural and functional aspects of the remainder of the device 40 are applicable and relevant to the left bicycle control device.

A grip cover 64 (e.g., a shifter cover, a hood cover, etc.) is disposed over at least portions of the gripping portion 56, and may be disposed over at least part of the horn portion 54, to provide a cushion or an ergonomic gripping surface for a user. The grip cover 64 is removable from the housing 46. The removal of the grip cover 64 may be to provide access to internal components of the right bicycle control device 40, or to replace the grip cover 64. The grip cover 64 includes a first or high durometer portion. The high durometer portion includes an attachment mechanism 66, such as a snap tab which may include toolless connection such as snap protrusions and/or other components to secure or attach the grip cover 64 to the housing 46. The attachment mechanism 66 may also involve tool based attachment, such as with a screw as is illustrated with reference to FIG. 7. The attachment mechanism 66, or components thereof, allows the grip cover 64 to removably engage the housing 46. In an embodiment, the attachment mechanism 66 is formed of a same or similar high durometer material as the high durometer portion of the grip cover 64. The grip cover 64 also includes a second or low durometer portion 68. The grip cover 64 further defines a transition area 70 that extends between the first end 48 of the housing 46 and the handlebar 38. As used herein, relative durometer portions (e.g. high and low) are general references to durometer scales. For example, the American Society for Testing and Materials ("ASTM") standard D2240 type A, type D, and/or type OO scales may be used to measure relative or specific durometer values. Other scale may also be used, such as the ASTM type B or type C scales.

The high durometer portion and the low durometer portions of the grip cover may be connected or otherwise attached using any technique. For example, co-molding, co-bonding, and/or other techniques may be used. The high durometer portion and the low durometer portions may also be attached using mechanical techniques, such as is described with respect to FIGS. 8 and 9.

Figure 3:
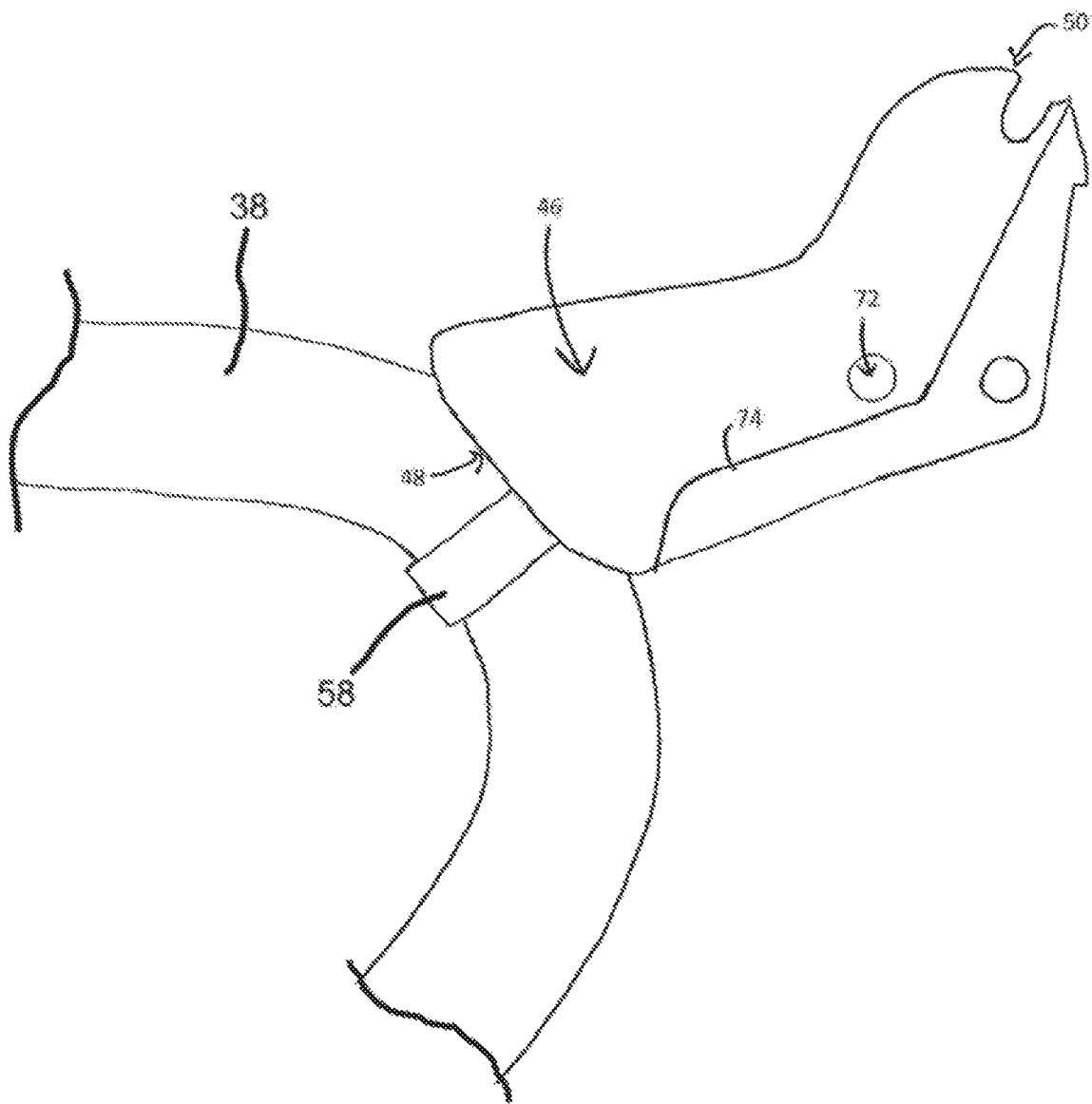
FIG. 3 is a right side elevational view of a housing of the bicycle control device of FIG. 2.

The grip cover 64 advantageously provides a tight-fitting relationship to the housing 46. Grip cover designs may use a soft durometer material to interlock with housings, resulting in an undesirable fit and finish. For example, thermoplastic elastomers or silicone are typical materials that are used and have a durometer of about 50 Shore A. Usage and aggressive riding conditions can cause the grip covers to creep and twist on the housings because of the softness of the material. FIG. 3 shows the housing 46 with the grip cover 64, the shift lever 60, and the brake lever 62 removed for clarity. The housing 46 includes a grip engaging feature in the form of a recess 72 and a grip shoulder 74. While FIG. 3 shows a right side of the housing 46, the left side of the housing 46 may include a retention receptacle in the form of a recess 72, and/or grip shoulder 74. The grip shoulder 74 may be continuous, wrapping around the entire housing 46. The grip shoulder 74 defines a grip/housing interface profile where the grip cover 64 abuts the housing 46. The grip/housing interface profile provides a substantially flush transition from the grip cover 64 to the housing 46 to provide a comfortable gripping surface. In one embodiment, the housing 46 is constructed of carbon fiber nylon composite or a glass filled nylon composite having a durometer of about 85 Shore D. In other embodiments, the housing 46 is constructed from a material having a durometer of between about 55 and about 85 Shore D, as desired.

Figure 4:
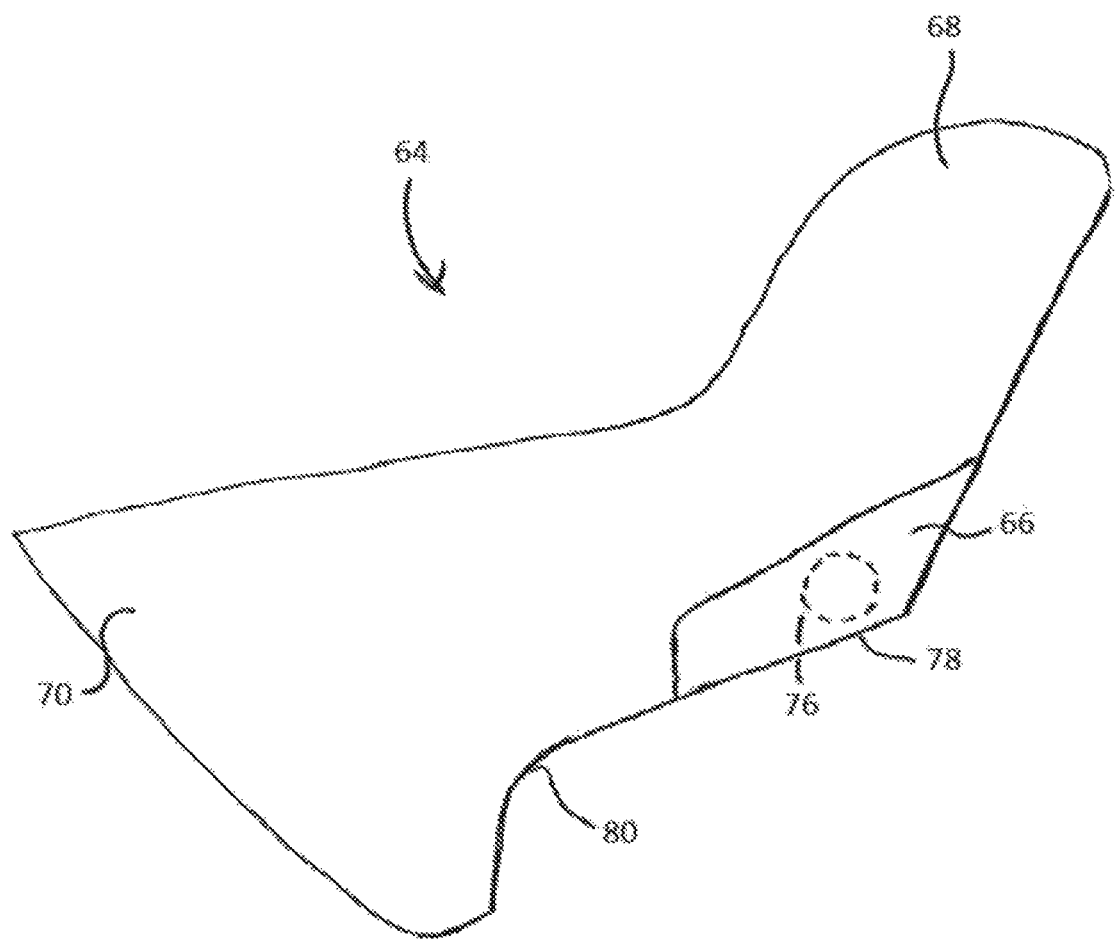
FIG. 4 is a right side elevational view of a grip cover of the bicycle control device of FIG. 2.

Turning to FIG. 4, an embodiment of the grip cover 64 is shown removed from the housing 46. The attachment mechanism 66 is a high durometer portion of the grip cover 64. The attachment mechanism 66, such as a snap tab, includes a grip cover projection 76 sized to engage surfaces defining a snap recess 72. The attachment mechanism 66 includes a snap tab edge 78 that is shaped to engage a portion of the grip shoulder 74 and match the corresponding portion of the grip/housing interface profile to provide a smooth transition (see FIG. 5). While FIG. 4 shows a right side of the grip cover 64, the left side of the grip cover 64 also includes an attachment mechanism 66 that is arranged to engage the left side of the housing 46. In one embodiment, the attachment mechanism 66 is formed of a first material (e.g., Acrylonitrile butadiene styrene or ABS) having a durometer of about 75 Shore D. In other embodiments, the attachment mechanism 66 is constructed from a material having a durometer of between about 30 and about 85 Shore D, as desired.

Still referring to FIG. 4, the low durometer portion 68 defines a low durometer edge 80 that is shaped to engage a portion of the grip shoulder 74 and match the corresponding portion of the grip/housing interface profile to provide a smooth transition. In one embodiment, the low durometer portion 68 is formed of a second material (e.g., thermoplastic polyurethane) having a durometer of about 50 Shore A. In other embodiments, the low durometer portion 68 is constructed from a material having a durometer of between about 30 and about 70 Shore A, as desired.

The transition area 70 may be constructed of the same material as the low durometer portion 68 and is sized to envelop the housing 46 at the first end 48 and provide a transition to the handlebar 38. The low durometer portion 68 extends over the housing 46. In one embodiment, the transition area 70 is sized such that a tension is applied to the low durometer material when the grip cover 64 is installed on the housing 46. For example, uninstalled (i.e. untensioned) dimensions of the grip cover 64 may be different than installed (i.e. tensioned) dimensions of the grip cover 64 as the low durometer portion 68 of the grip cover 64 is stretched over the housing 46, and secured to the housing 46 with the high durometer portion of the grip cover 64.

Turning to FIG. 5, one embodiment of the grip cover 64 is shown with the attachment mechanism 66 comolded to the low durometer portion 68 at a union in the form of a comolding joint 82. In other words, the attachment mechanism 66 is joined to the low durometer portion 68 during a molding process such that the grip cover 64, when formed, is a single piece. Further, the grip cover projection 76 includes a projection retention mechanism in the form of a projection or hooking tab 84 extending from the projection 76 and shaped to be received in a recess 86 formed within the snap recess 72.

Assembly of the grip cover 64 onto the housing 46 will be described below with reference to FIG. 2. The transition area 70 is first passed over the brake lever 62 and the shift lever 60, and onto the housing 46. The transition portion 70 is then stretched over the horn portion 54 and the gripping portion 56 until the transition area 70 is stretched over the second end 50 of the housing 46 and creates a desirable transition to the handlebar 38. The attachment mechanisms 66 are then pulled into place and the grip cover projections 76 are inserted or otherwise attached into the snap recesses 72 formed in the housing 46 such that the tab edge 78 is abutted with the grip shoulder 74 formed in the housing 46. Engagement of the attachment mechanism 66 with the snap recesses 72 applies a tension to the low durometer portion 68 in the direction shown by lines A and brings the low durometer edge 80 into abutment with the grip shoulder 74 of the housing 46 such that a smooth gripping surface is provided around the right bicycle control device 40. The low durometer portion 68 is stretched across or over the housing 46 such that the low durometer portion 68 is in contact with the housing 46 and is inhibited from moving relative to the housing 46. The tension caused by the stretching causes a slight longitudinal deformation of the low durometer portion 68 at least in the directions shown by lines A and increases the resistance of the low durometer portion 68 to further stretching and deformation.

In operation, the user is provided with a cushioned gripping surface by the low durometer portion 68 while the attachment mechanisms 66 provide a secure connection to the housing 46 and reduce bagginess and twist relative to the housing 46 during use. The grip cover 64 also provides a securely connected gripping surface while leaving a portion 87 of the housing 46 exposed (see, for example, FIG. 2), thereby providing the ability to access a battery of an electronic shifting system or another component without the necessity of removing the grip cover 64. The attachment mechanisms 66 provide for easy assembly and replacement of the grip covers 64 with less stretching and pulling required as compared to typical grip covers. Additionally, because the attachment mechanisms 66 interact with the snap recesses 72, the placement of the grip cover 64 on the housing 46 is easier than with typical grip covers, resulting in more consistent and visually pleasing installations. The transition area 70 is arranged to provide a smooth transition to grip tape applied to the handlebar 38, or a handlebar 38 with no grip tape applied, such that the user enjoys a continuous and improved gripping surface from the handlebar 38 to the horn portion 54.

FIG. 6 shows an alternative grip cover 164 and housing 146 that are similar to the grip cover 64 and housing 46, respectively, described above, wherein like parts will be noted with similar numerals. The grip cover 164 includes a snap projection 176 and a snap retention mechanism in the form of a groove 88 sized to receive a snap, or retaining, ring 90. The snap recess 172 defines a through hole sized to receive the snap projection 176. In operation, the user inserts the snap projection 176 into the snap recess 172 and the snap, or retaining, ring 90 is engaged with surfaces defining the groove 88 to maintain the grip cover 164 in position relative to the housing 146.

Figure 7:
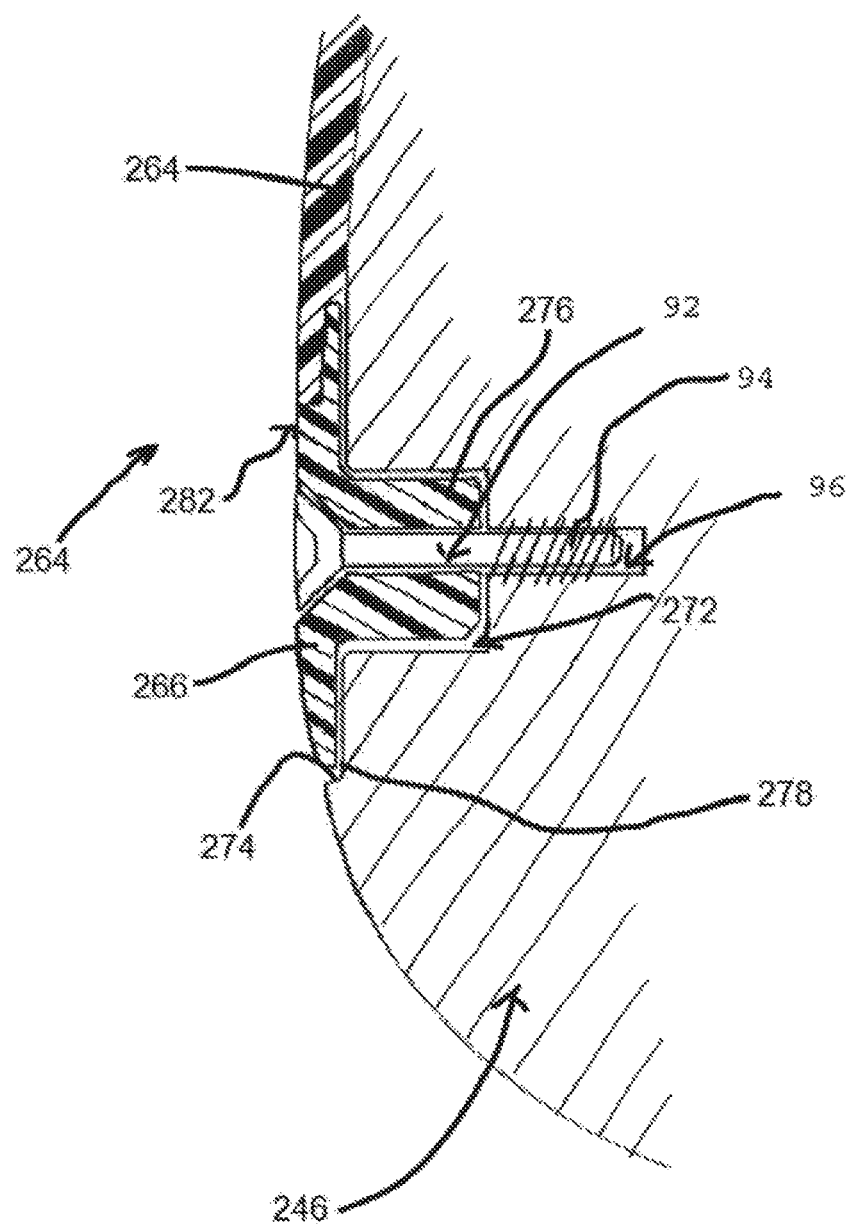
FIG. 7 is a partial, sectional view of another bicycle control device according to still another embodiment.

FIG. 7 shows an alternative grip cover 264 and housing 246 that are similar to the grip cover 64 and housing 46, respectively, described above, wherein like parts will be noted with similar numerals. The grip cover 264 includes a projection 276 and a retention mechanism in the form of a through hole 92 sized to receive a fastener in the form of a screw 94. The recess 272 includes a fastener aperture 96 sized to receive the screw 94. In operation, the user inserts the projection 276 into the recess 272 and the screw 94 is passed through the through hole 92 and engaged with surfaces defining the fastener aperture 96 to maintain the grip cover 264 in position relative to the housing 246.

FIGS. 8 and 9 show an alternative grip cover 364 that is similar to the grip cover 64 described above, for example having a first end and a second end 448, 450. The low durometer portion 368 of the grip cover 364 is not comolded to the high durometer portion that includes the snap tabs 366, but is rather mechanically connected thereto. The low durometer portion 368 defines a coupling aperture 98 and the snap tab 366 includes a coupling projection 100 sized to engage surfaces defining the coupling aperture 98 and connect the snap tab 366 to the low durometer portion 368. In one embodiment, the low durometer portion includes multiple coupling apertures 98 and multiple coupling projections 100 that interact to connect the snap tab 366 to the low durometer portion 368. In operation, the snap tab 366 is engaged with the low durometer portion 368 ahead of installation onto the housing 46. In other embodiments, the high durometer portion includes a press fit snap or a molder zipper.

Figure 10:
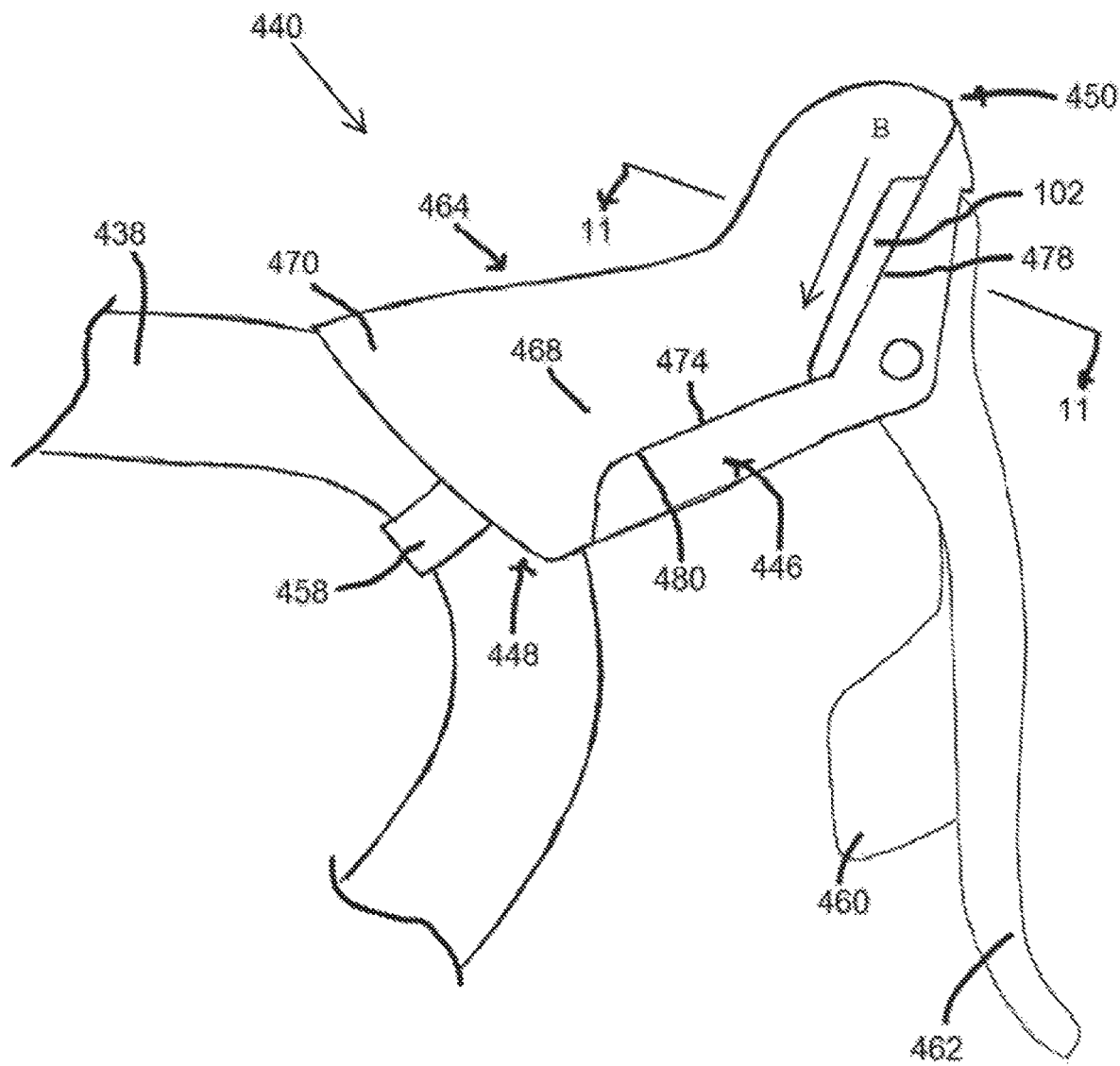
FIG. 10 is a right side elevational view of a bicycle control device according to another embodiment.
Figure 11:
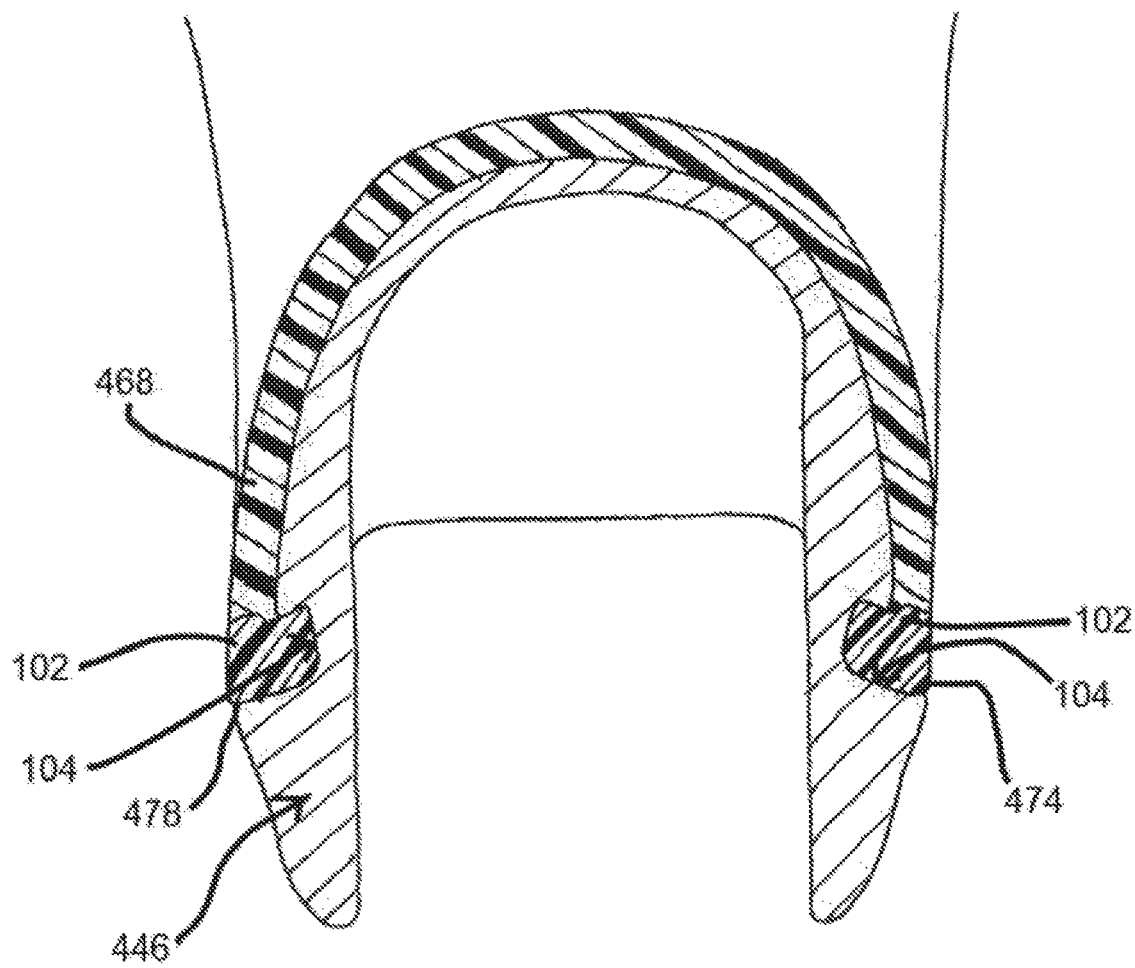
FIG. 11 is a sectional view of the bicycle control device of FIG. 10 taken along the line 11-11 of FIG. 10.

FIGS. 10 and 11 are directed to a right bicycle control device 440 that is similar to the right bicycle control device 40 discussed above, wherein like components are identified with similar numerals. The grip cover 464 includes a high durometer portion that includes an attachment mechanism having an interlocking slide 102 shaped to be received within a retention receptacle in the form of a groove or sliding track 104 provided in the housing 446. As is clearly shown in FIG. 11, the low durometer portion 468 is comolded to the interlocking slide 102. In another embodiment, the interlocking slide 102 may mechanically couple with the low durometer portion 486. The illustrated interlocking slide 102 provides a generally hook shaped cross section. In other embodiments, the interlocking slide 102 and corresponding sliding track 104 may define a captured profile, such that the interlocking slide 102 cannot exit the sliding track 104 in a direction perpendicular to a sliding direction B. In operation, the grip cover 464 is installed by interlocking the interlocking slide 102 with the sliding track 104 and sliding the interlocking slide 102 in the direction B until the grip cover 464 is positioned as desired.

Figure 12:
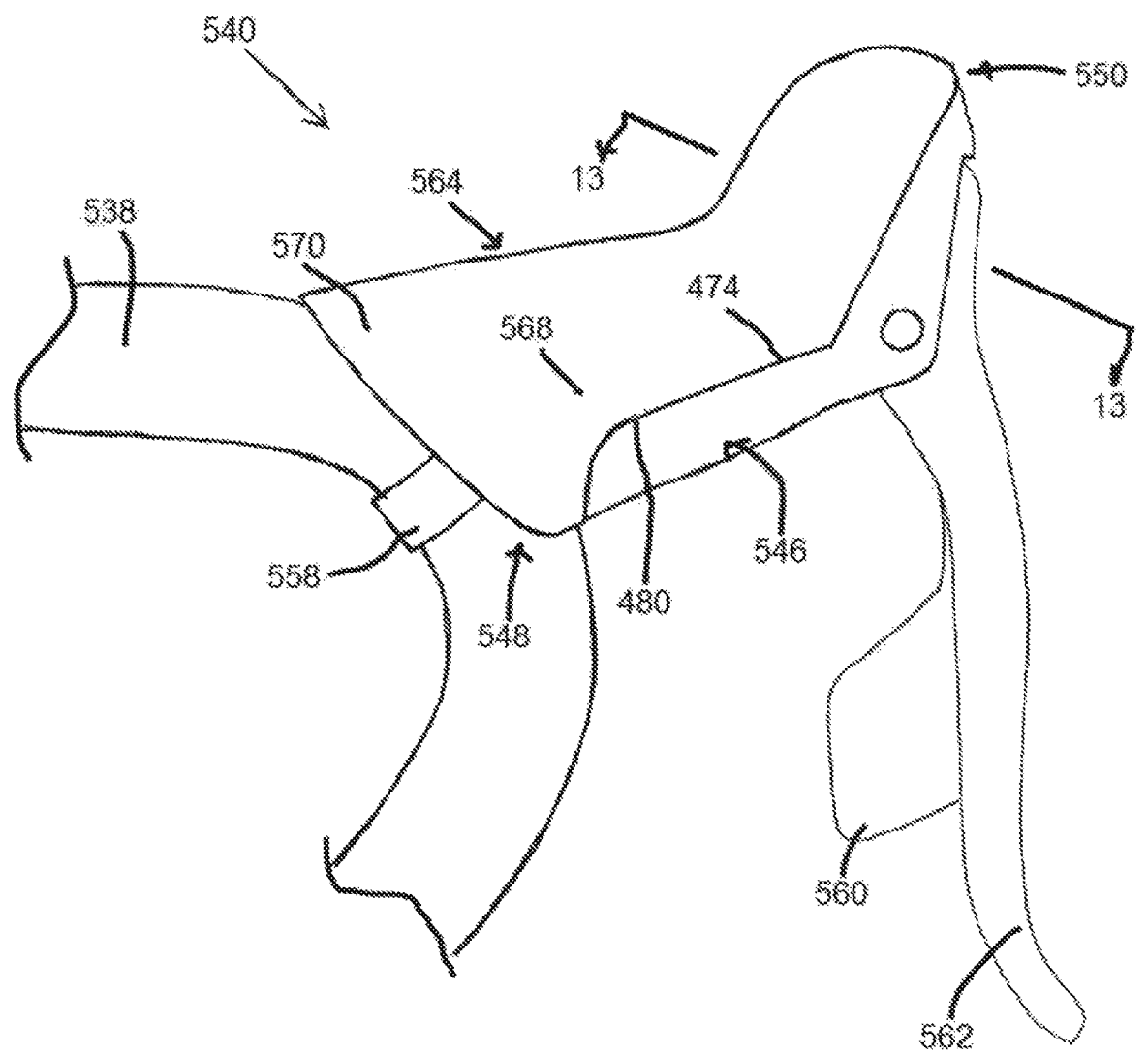
FIG. 12 is a right side elevational view of a bicycle control device according to another embodiment.
Figure 13:
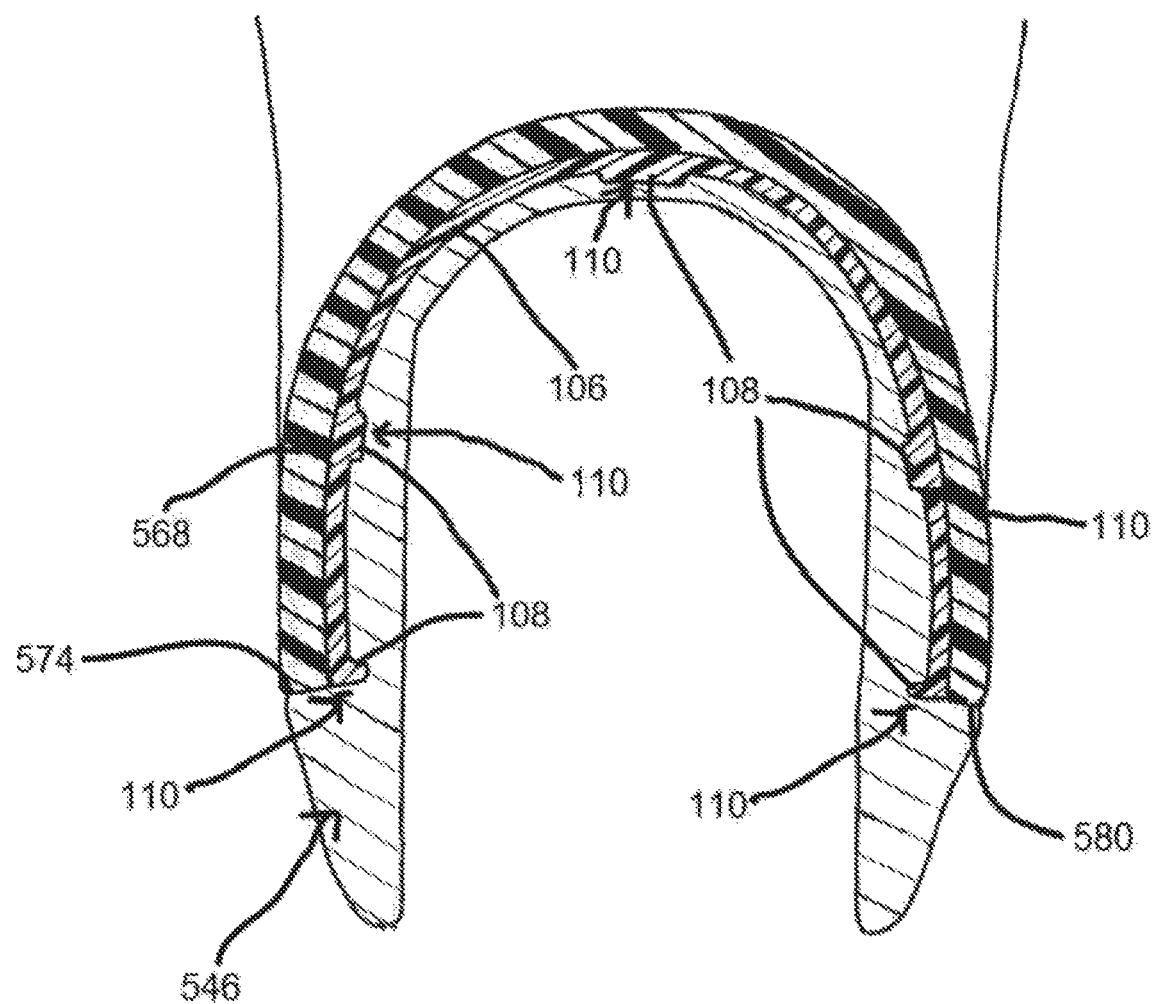
FIG. 13 is a sectional view of the bicycle control device of FIG. 12 taken along the line 13-13 of FIG. 12.
Figure 14:
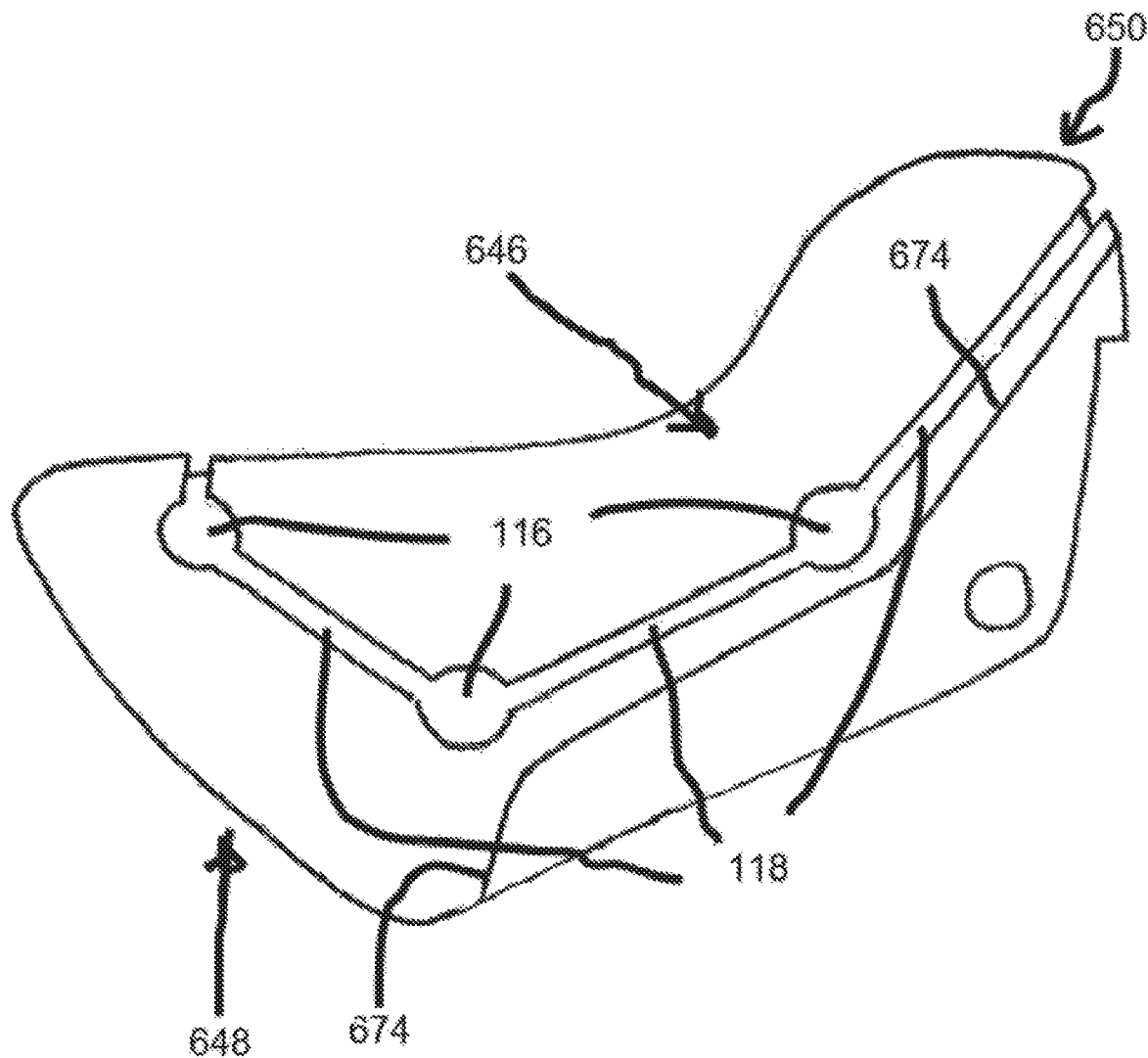
FIG. 14 is a right side elevational view of a housing of a bicycle control device according to another embodiment.
Figure 15:
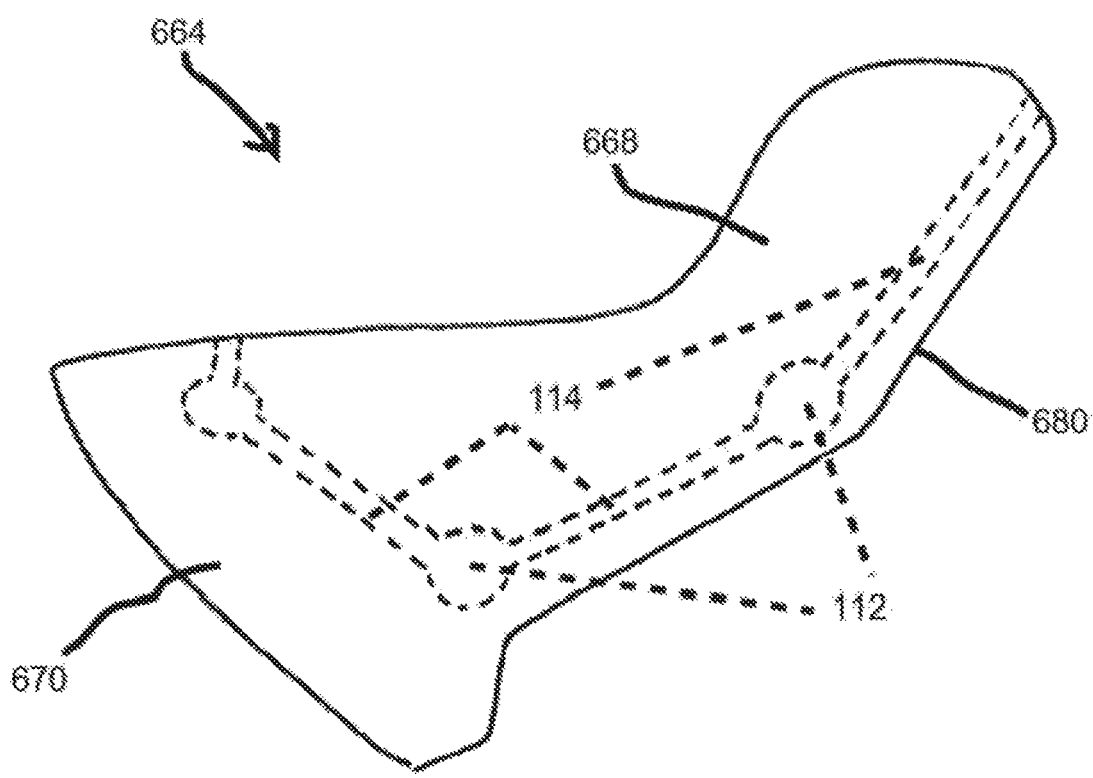
FIG. 15 is a right side elevational view of a grip cover configured to engage the housing of FIG. 14.

FIGS. 12 and 13 are directed to a right bicycle control device 540 that is similar to the right bicycle control device 40 discussed above, wherein like components are identified with similar numerals, for example a first end and a second end 548, 550. The grip cover 564 includes a high durometer portion in the form of a concealed rigid shell 106 that includes projections 108 arranged to be received in retention receptacles. The grip cover 564 also includes a grip shoulder 474 and an edge 480 to a low durometer portion. In the present embodiment, the retention receptacles comprise recesses 110 formed in the housing 546 corresponding to the projections 108. The low durometer portion 568 is comolded over the top of the concealed rigid shell 2106. In operation, the grip cover 564 is pressed onto the housing 546 until the projections 108 of the concealed rigid shell 106 snap into the recesses 110 to hold the grip cover 564 in place relative to the housing 546 without the use of additional fasteners or sliding undercuts.

Figure 16:
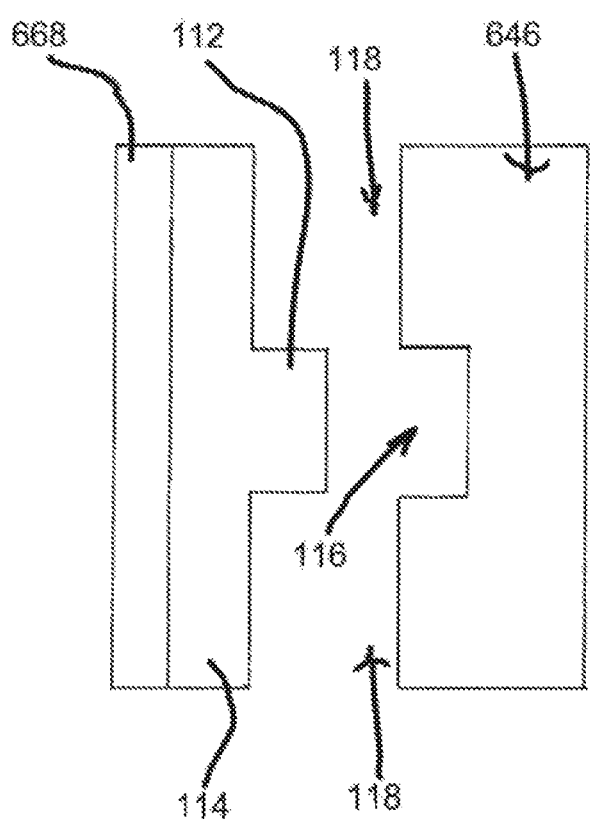
FIG. 16 is an exploded schematic sectional view of the housing of FIG. 14 and the grip cover of FIG. 15.
Figure 17:
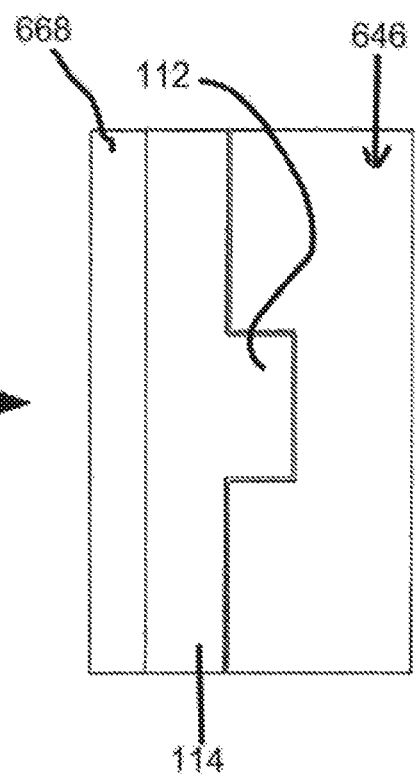
FIG. 17 is a schematic sectional view of the housing of FIG. 14 and the grip cover of FIG. 15 in a combined state.

FIGS. 14-17 are directed to a housing 646 and a grip cover 664 that are similar to the housing 46 and the grip cover 64 discussed above, wherein like components are identified with similar numerals, for example a first end and a second end 648, 650, and a grip shoulder 674. The grip cover 664 includes a high durometer portion in the form of a plurality of concealed snaps 112 and concealed ribs 114 arranged to be received within a retention receptacle in the form of corresponding snap recesses 116 and rib recesses 118, respectively. In operation, the grip cover 664 is assembled similarly to the grip cover 64 by pulling the transition area 670 onto the housing first, then engaging the concealed snaps 112 with the snap recesses 116 and the concealed ribs 114 with the rib recesses 118 as shown in FIGS. 16 and 17. In another embodiment, the arrangement of concealed snaps 112 and concealed ribs 114 could be combined with other embodiments. For example, the concealed snaps 112 and concealed ribs 114 could extend from the concealed rigid shell 106 discussed above. Alternatively, the concealed snaps 112 and concealed ribs 114 could be constructed of the low durometer material and be used in conjunction with another high durometer portion including an attachment mechanism, such as snap tabs, for example.

Figure 18:
FIG. 18 is a sectional view of a transition area of the grip cover of FIG. 4.
Figure 19:
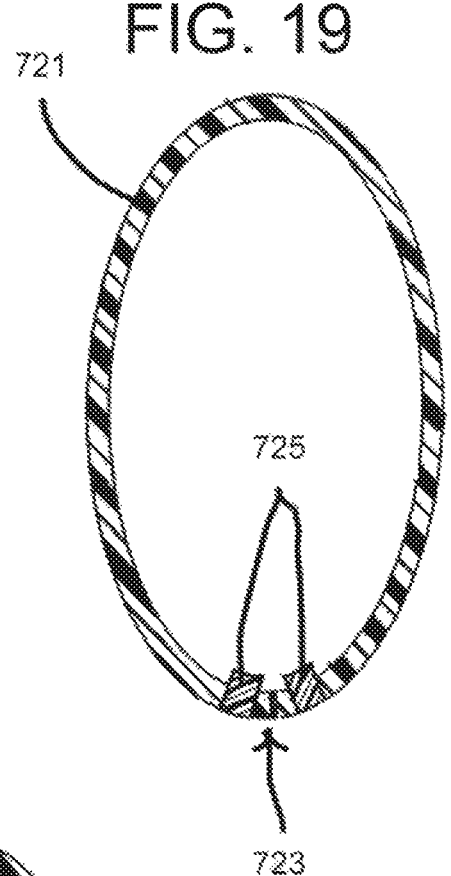
FIG. 19 is a sectional view of a transition area of a grip cover according to another embodiment.
Figure 20:
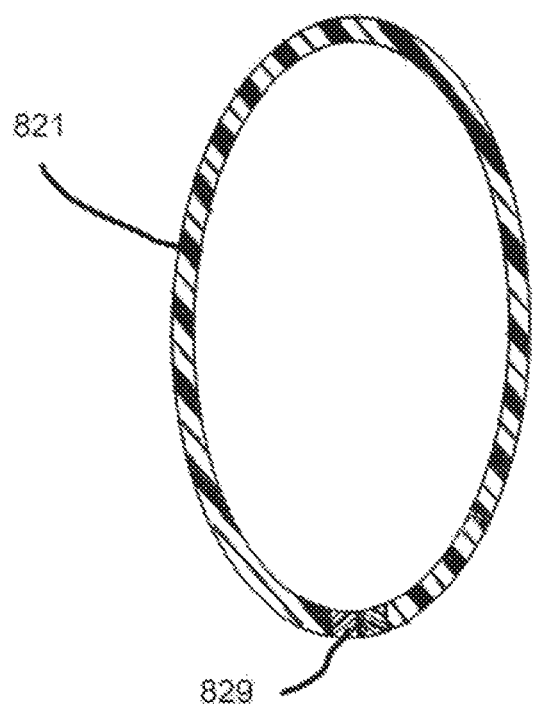
FIG. 20 is a sectional view of a transition area of a grip cover according to still another embodiment.

Turning now to FIG. 18, the transition area 70 is shown in cross section, which provides a continuous annular surface that contacts and surrounds a housing. FIG. 19 shows another embodiment where a transition area 721 includes a seam 723 that allows two high durometer portions in the form of interlocking slides 725 to come apart. The interlocking slides 725 could engage a housing arranged to receive the interlocking slides 725 to hold the transition area 721 in place when installed onto a right bicycle control device. FIG. 20 shows another embodiment where a transition area 821 includes a zipper 829 that can be opened and closed to aid installation of the grip cover.

In an embodiment, a grip cover for a bicycle control device includes a high durometer portion comprising an attachment mechanism configured to engage the bicycle control device to maintain the grip cover in contact with the bicycle control device. The grip cover also includes a low durometer portion connected to the high durometer portion, the low durometer portion dimensioned to extend over the bicycle control device. The low durometer portion may be configured to be tensioned by the high durometer portion when the grip cover is installed on the bicycle control device. The high durometer portion may define a durometer of between about 30 and about 85 Shore D, and the low durometer portion may define a durometer of between about 30 and about 70 Shore A. For example, the low durometer portion may define a durometer of about 50 Shore A and the high durometer portion may define a durometer of about 75 Shore D. The high durometer portion may be constructed of acrylonitrile butadiene styrene, and the low durometer portion may be constructed of thermoplastic polyurethane. The attachment mechanism may involve tooled or tool-less attachment to the bicycle control device. The attachment mechanism of the high durometer portion may include one or more projections configured to engage the bicycle control device. The projection may include a tab and/or a groove and a retaining ring engagable with surfaces defining the groove to maintain the grip cover installed on the bicycle control device. The projection may include a through hole sized to receive a fastener that passes through the through hole and is configured to engage the bicycle control device. The attachment mechanism of the high durometer portion may include an interlocking slide configured to engage the bicycle control device. The attachment mechanism of the high durometer portion includes a concealed shell configured to engage the bicycle control device. The attachment mechanism of the high durometer portion may include a concealed snap configured to engage the bicycle control device. The attachment mechanism of the high durometer portion may include a concealed rib configured to engage the bicycle control device. The attachment mechanism of the high durometer portion may include a zipper. The low durometer portion and the high durometer portion are coupled. For example, the low durometer portion and the high durometer portion may be comolded and/or mechanically coupled.

In an embodiment, a grip cover for a bicycle control device includes a low durometer portion defining a durometer of less than about 70 Shore A and configured to be stretched across the bicycle control device. The low durometer portion may define a durometer of between about 30 and about 70 Shore A, for example 50 shore A. The low durometer portion may be constructed of thermoplastic polyurethane.

In an embodiment, a bicycle control device comprising includes a housing having a retention receptacle and a lever coupled to the housing. The bicycle control device also includes a grip cover coupled to the housing and including a first portion and a second portion, wherein the first portion has a durometer value greater than the second portion, wherein the first portion engages the retention receptacle to maintain the grip cover on the housing, and wherein the second portion is connected to the first portion and extends over the housing. The retention receptacle may include a recess, and the first portion may include an attachment mechanism configured to be received within the recess. The attachment mechanism may include a projection sized to be received within the recess. The attachment mechanism may include the projection and a hooking tab extending from the projection and sized to be received within the recess. The attachment mechanism may include a projection and a groove formed on the projection. The projection may be sized to be received within the recess, and may further include a retaining ring engagable with surfaces defining the groove to maintain the projection within the recess. The attachment mechanism may include a projection sized to be received within the recess, and may further include a fastener passing through the projection and engaging the housing. The retention receptacle may include a slide track, and the first portion may include an interlocking slide sized to be slidingly received within the slide track. The retention receptacle may include a plurality of recesses, and the first portion may include a plurality of projections received in the plurality of recesses. The first portion may include a concealed shell. The retention receptacle may include a plurality of projection recesses and a plurality of rib recesses, and the first portion may include an attachment mechanism comprising a plurality of concealed projections sized to be received within the plurality of projection recesses and a plurality of concealed ribs sized to be received within the plurality of rib recesses. The second portion may include a transition area that annularly surrounds the housing. The second portion may define a durometer of between about 30 and about 70 Shore A, and/or the first portion may define a durometer of between about 30 and about 85 Shore D. The first portion may be constructed of acrylonitrile butadiene styrene, and the second portion may be constructed of thermoplastic polyurethane. The second portion and the first portion may be comolded.

Numerous modifications to the embodiments disclosed herein will be apparent to those skilled in the art in view of the foregoing description. For example, any of the embodiments disclosed herein may be modified to include any of the structures and/or methodologies disclosed in connection with different embodiments. Accordingly, this disclosure is to be construed as illustrative only and is presented for the purpose of enabling those skilled in the art to make and use the invention and to teach the best mode of carrying out same. The exclusive rights to all modifications which come within the scope of the appended claims are reserved.

What is claimed is:

1. A grip cover for a bicycle control device, the grip cover comprising:
a first durometer portion and a second durometer portion, the first durometer portion having a higher durometer than the second durometer portion,
the first durometer portion comprising an attachment mechanism that includes a projection configured to engage the bicycle control device to maintain the grip cover in contact with the bicycle control device, the projection including a tab; and the second durometer portion connected to the first durometer portion, the second durometer portion dimensioned to fit on the bicycle control device.

2. The grip cover of claim 1, wherein the second durometer portion is configured to be tensioned by the first durometer portion when the grip cover is installed on the bicycle control device.

3. The grip cover of claim 1, wherein the first durometer portion defines a durometer of between 30 and 85 Shore D, and the second durometer portion defines a durometer of between 30 and 70 Shore A.

4. The grip cover of claim 3, wherein the second durometer portion defines a durometer of 50 Shore A.

5. The grip cover of claim 4, wherein the first durometer portion defines a durometer of 75 Shore D.

6. The grip cover of claim 1, wherein the first durometer portion is constructed of acrylonitrile butadiene styrene.

7. The grip cover of claim 1, wherein the second durometer portion is constructed of thermoplastic polyurethane.

8. The grip cover of claim 1, wherein the projection includes a groove and a retaining ring engagable with surfaces defining the groove to maintain the grip cover installed on the bicycle control device.

9. The grip cover assembly of claim 1, wherein the projection includes a through hole sized to receive a fastener that passes through the through hole and is configured to engage the bicycle control device.

10. The grip cover of claim 1, wherein the attachment mechanism of the first durometer portion includes an interlocking slide configured to engage the bicycle control device.

11. The grip cover of claim 1, wherein the attachment mechanism of the first durometer portion includes a concealed shell configured to engage the bicycle control device.

12. The grip cover of claim 1, wherein the attachment mechanism of the first durometer portion includes a concealed rib configured to engage the bicycle control device.

13. The grip cover of claim 1, wherein the attachment mechanism of the first durometer portion comprises a plurality projections configured to engage the bicycle control device.

14. The grip cover of claim 1, wherein the second durometer portion and the first durometer portion are comolded.

15. The grip cover of claim 1, wherein the second durometer portion and the first durometer portion are mechanically coupled.

16. The grip cover of claim 1, wherein the second durometer portion is configured cover at least part of a gripping portion of the bicycle control device.

17. The grip cover of claim 1, wherein the projection is a first projection, and the grip cover further comprises a second projection, the second projection disposed on a different side of the bicycle control device than the first projection.

18. The grip cover of claim 17, wherein the second durometer portion is disposed between the first projection and the second projection.

* * * * *